June 19, 1934.　　　　S. O. WHITE　　　　1,963,219
FREE WHEEL AND CLUTCH INTERLOCK
Filed Dec. 5, 1931
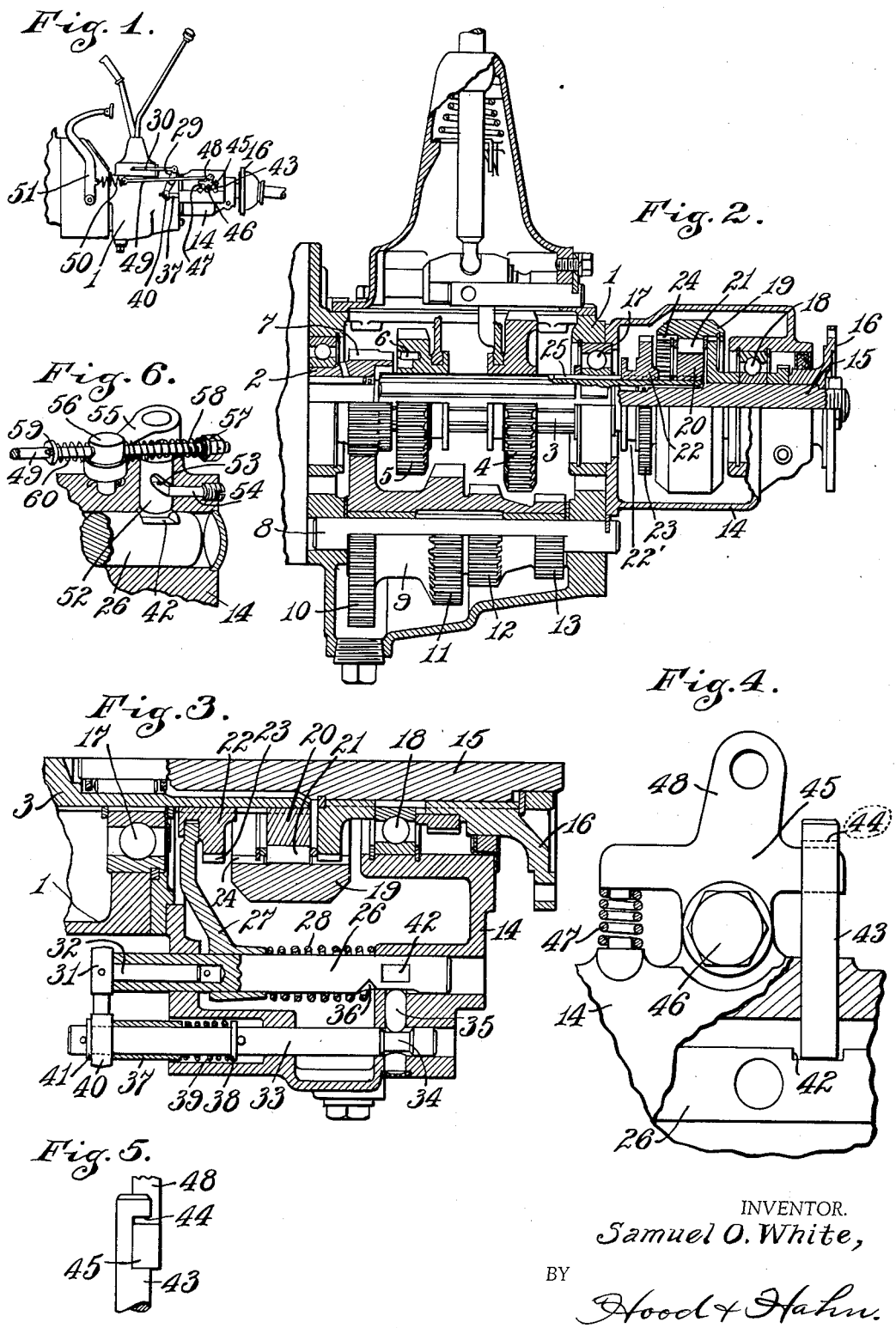
INVENTOR.
Samuel O. White,
BY
Hood & Hahn
ATTORNEYS Patented June 19, 1934

1,963,219

UNITED STATES PATENT OFFICE 1,963,219

FREE WHEEL AND CLUTCH INTERLOCK

Samuel O. White, Muncie, Ind., assignor, by mesne assignments, to Free Wheeling Patents Corporation, South Bend, Ind., a corporation of Delaware Application December 5, 1931, Serial No. 579,246

5 Claims. (Cl. 192—48)

My invention relates to improvements in automobile transmissions and particularly to that type of transmission, wherein an overrunning clutch is associated with a transmission mechanism in such a manner as to permit the disconnection of the propeller shaft from the engine shaft when the momentum of the car causes the speed of the propeller shaft to exceed that of the engine shaft, and particularly to the above type which has become commercially known as the free wheeling type of transmission, wherein means is provided for locking up the overrunning clutch in order to permit the transmission to operate in the conventional manner.

In the operation of this type of free wheeling transmission, it has been found that it is desirable that the locking up of the overrunning clutch should be performed with the engine clutch disengaged, as such an arrangement prevents undue strain or jar on the parts. On the other hand it has been found quite convenient to throw the lock up mechanism out of action without declutching the engine clutch as this may be done without affecting the parts of the transmission.

It is one of the objects of my invention to provide means for insuring the throwing out or declutching of the engine clutch whenever the lock up mechanism for the free wheeling clutch is manipulated into operative position.

Another object of my invention is to provide a structure of the above type wherein it is unnecessary to declutch the engine clutch when it is desired to render the free wheeling clutch operative, after the same has been once locked up.

For the purpose of disclosing my invention, I have illustrated one embodiment thereof in the accompanying drawing, in which:

Fig. 1 is a side elevation of an engine transmission showing an application of my invention;

Fig. 2 is a longitudinal sectional view of a transmission with a free wheeling mechanism of a type with which my invention may be readily used;

Fig. 3 is a detailed section showing the lock up operating mechanism for the free wheeling clutch;

Fig. 4 is an end elevation of the preventer mechanism for the free wheeling lock up mechanism;

Fig. 5 is a detail of the operating connection, and

Fig. 6 is a detail view of a modified form of my preventer means.

In the embodiment of the invention disclosed, I have shown a transmission of the conventional three speed sliding gear type, although it will be understood that any type of transmission may be used. In this transmission the housing 1 has extending therein the driving shaft 2 which is in alignment with the driven shaft 3 also extending into the housing and piloted in the driving shaft. This driven shaft carries the axially shiftable splined gear 4 and the axially shiftable splined gear 5, which gear is provided with internal clutch teeth 6 adapted to mesh, under certain conditions, with the teeth 7 of a gear on the end of the driving shaft 2. Mounted beneath the aligned shafts 2 and 3 is a jack shaft 8 provided with a spindle 9 having gears 10, 11, 12 and 13. The gear 10 meshes with and is constantly driven from the gear teeth 7. The sliding gear 5 is adapted to mesh with the gear 11 for second speed drive and for high speed drive to be moved to engage the teeth 6 and 7. The gear 4 is adapted to mesh with the gear 12 for low speed drive and to be moved into mesh with an idler (not shown) meshing with the gear 13 for reverse drive.

Mounted on the rear end of the casing 1 is a second casing 14 into which extends the driven shaft 3 and a propeller shaft 15 provided with means 16 for connection with the propeller shaft of the vehicle. This propeller shaft is piloted at one end in the driven shaft 3, which it will be noted is supported by the ball bearings 17, and at its opposite end is supported in ball bearings 18. The propeller shaft 15 has mounted thereon the outer member 19 of an overrunning clutch which is adapted to overhang the inner member 20 of the overrunning clutch. Suitable roller clutch members 21 are interposed between these members for connecting the same when the driven shaft is rotated in a clock-wise direction and for disconnecting the members when the propeller shaft rotates relatively to the driven shaft in a clock-wise direction. Splined on the driven shaft 3 is a two-way clutch member 22 having two-way clutch teeth 23 adapted, when the clutch member is moved in one direction, to mesh with the two-way clutch teeth 24 on the member 19 whereby, when desired the overrunning clutch may be locked up and a two-way drive established between the driven shaft 3 and the propeller shaft 15.

As it is desirable that the two-way clutch member should be moved into operative position when the transmission is moved into reverse drive, I provide in a longitudinal slot in the shaft 3 a key member 25, one end of which abuts against the two-way clutch member 22 and the other end of which is in the path of the sliding gear 4. The front end of the key member 25 is in such a position that as the sliding gear 4 is moved rearwardly into reverse drive position it strikes the key member 25 and through it moves the two-way clutch member 22 to lock up position.

The lock up clutch member 22 is manually controlled through the medium of a shift rod 26 having a shifter fork 27 fixed thereon and engaging in an annular groove 22' in the hub of the lock up clutch member 22. This shift rod is slidably mounted in the casing 14 and is biased toward non-lock up position by a coiled spring 28 so that when the clutch member 22 is moved to lock up position with the movement of the transmission into reverse drive it will automatically move to non-lock up position, under certain conditions, when the transmission is moved out of reverse drive position. The shift rod 26 is moved into lock up position through the medium of a rocking lever 29 pivoted on the transmission casing 1. This lever may be manipulated by any means, such as a lever, Bowden wire or other operating means within convenient reach of the driver of the automobile, the link 30 providing means for connecting the operating means to the lever 29. The lower end of this operating lever is provided with a bearing disc 31, bearing against the end of the shift rod 26 and provided with a guiding pin 32 telescoping the end of the rod 26.

In view of the fact that when the shift rod 26 is moved into lock up position it is biased towards its non-lock up position by the coiled spring 28, means should be provided for locking the shift rod in its lock up position when it is desired that it should remain so by the operator. To this end a lock up rod 33 is provided having an annular groove 34 at its rear end adapted when the rod is in its projected position to receive the lock member 35. This lock member 35 takes into a recess or opening 36 in the shift rod 26 when the shift rod is in its lock up position and when the lock rod 33 is shifted to its locked position. A sleeve 37 surrounds the rod 33 and interposed between this sleeve and a collar 38 fixed on the rod 33 is a coiled spring 39 which, when placed under tension biases the rod 33 into its locking position. The sleeve 37 is moved to compress the spring 39 by a collar member 40 connected to the operating lever 29 and moving with the member 31. This collar 40 is interposed between the sleeve 37 and a fixed collar 41 on the rod 33.

The operation of the parts thus far described is as follows: When it is desired to move the lock up clutch member 22 to lock up position, the lever 29 is rocked by the operator thereby moving the rod 26 to the right, looking at Fig. 3, shifting the lock up member 22 into lock up position, compressing the spring 28 and moving the recess 36 into alignment with the latch member 35. This same movement moves the sleeve 37 to the right, looking at Fig. 3, compressing the spring 39 so that, by the time the recess 36 has moved opposite the latch member 35, the camming action of the walls of the groove 34, under the axial movement of the rod 33, will project the latch member 35 into the recess member 36 projecting the rod 33 to a position where the groove 34 is beyond the latch member 35 thus holding the latch member against retraction and locking the shift rod 26 against movement under the influence of the spring 28. The overrunning clutch is thus locked up so that, the propeller shaft and the driven shaft will be connected operating together in either direction. When it is desired to move the lock up member 22 into non-lock up position all that is necessary is for the operator, through the manipulation of the lever 29 to retract the locking rod 33 until the groove 34 coincides with the latch member 35. This permits the latch member to snap out of the recess 36 releasing the shift rod 26 and permitting it under the influence of the coiled spring 28 to move to non-lock up position.

In order to prevent the shift rod 26 from being moved into lock up position while the engine clutch is engaged, I provide a latching mechanism normally in latching position but so connected with the engine clutch operating pedal that when the clutch operating pedal is moved to throw the clutch out, the latch will be released. To this end the shift rod 26 is notched as at 42 to receive a vertically movable latch pin 43, the upper end of which is notched as at 44 to receive one end of a rocking arm 45. This arm is pivoted as at 46 and interposed between the opposite end of the arm and the top of the casing is a coiled spring 47 which tends to rock the arm to a position to maintain the pin 43 in engaging position. A bell crank arm 48 extends upwardly from the arm 45 and this bell crank arm is connected by a link 49 and a coiled spring 50 with the engine clutch operating pedal 51, the spring 50 being stronger than the spring 47. By this arrangement, when the engine clutch pedal 51 is depressed to disengage the engine clutch, the arm 45 will be rocked to raise the pin 43 out of the notch 42 releasing the shift rod 26 in order that it may be moved to lock up position. As soon as it has been moved to lock up position the notch 42 will have been moved from beneath the pin 43 and the releasing of the arm 45 to permit the pin to drop will merely cause it to drop on the top surface of the rod 26. Thus, no opposition will be offered to the movement of the shift rod 26 into non-lock up position, but as soon as it has moved to non-lock up position, the pin 43 will drop into the notch 42 locking the rod in non-lock up position until it is released by the shifting of the clutch pedal.

In Figure 6, I have illustrated a modified form of latching or preventer means for preventing the shifting of the shift rod 26 except when the engine clutch is disengaged. In the structure illustrated in this figure, the shifting rod 26 is as in Fig. 4 provided with a notch or recess 42. The stop or latch member in this instance comprises an oscillating vertically movable pin 52 mounted in the top of the casing 14 and provided with a cam slot 53 adapted to be engaged by the end of a stationary pin 54. The slot 53 is so formed that when the pin 52 is rotated in one direction, by the depression of the clutch pedal, the slot 53 raises the pin out of the notch 42. When it is rotated in the opposite direction by the release of the clutch pedal 51 and thereby engaging the clutch, it will be moved downwardly.

For operatively oscillating the pin 52, the pin is provided with the crank arm 55 in the outer end of which is rotatably mounted a headed bolt 56. The operating link 49 connected with the clutch pedal 51 extends through the head of this bolt 56 and interposed between the head and a set nut 57 on the rear end of the link 49 is a coiled spring 58. Also interposed between the head of the bolt 56 and a collar 59 on the link 49 is a second coiled spring 60. In this structure, the connection spring 50 between the pedal 51 and the link 49 is dispensed with, as the coiled spring 58 will take its place. In the operation of this structure, when the clutch pedal is depressed the link 49 will be moved to the left, see Fig. 6, and the coiled spring acting on the head of the bolt 56 will through the crank arm 55, rotate the pin 52 causing the cam slot 53 to raise the pin from notch 42 releasing the shift rod 26. The coiled spring 58 compensates for the difference in throw of the clutch pedal and permits a certain amount of lost motion between the clutch pedal and the arm 55. After the shift rod 26 has been moved to lock up the overrunning clutch, the pedal 51 being released, will place the coiled spring 60 under compression tending to oscillate the crank arm 55 in the opposite direction, and biasing the latch pin 52 in locking position to become operative whenever the shift rod 26 is shifted to non-lock up position with the notch 42 beneath the latch pin 52.

I claim the following:

1. In a transmission, the combination with a propeller shaft, of a variable speed gearing associated with said propeller shaft, a one-way clutch associated with said propeller shaft, a two-way clutch associated with said propeller shaft for rendering said one-way clutch inoperative and operating said propeller shaft in two directions, one of the members of said two-way clutch being normally biased to inoperative position, means for moving said member to operative position, means for locking said member in its operative position, and means for locking said member against movement to its operative position except when the engine clutch is disengaged.

2. In a transmission clutch mechanism for vehicle transmissions having an engine clutch and operating means therefor, in combination, an overrunning clutch including means for establishing a one-way drive through said clutch and means for establishing a two-way drive through said clutch, a shift rail for operating said two-way drive means having a lock pin receiving recess therein, a lock pin normally engaging said recess to prevent shifting of said rail, means for operating said lock pin to disengage the same from said recess and resilient means for connecting said operating means with the operating means for the engine clutch to permit continued movement of the engine clutch operating means in either direction after the lock pin has come to rest.

3. In a transmission clutch mechanism for vehicle transmissions having an engine clutch and operating means therefor, in combination, an overrunning clutch mechanism including means for establishing a one-way drive through said clutch mechanism and means for establishing a two-way drive through said mechanism, a shift rail for operating said two-way drive means having a lock pin receiving recess, a lock pin for engagement in said recess, an operating lever for said lock pin, resilient means operating on said lever to retain the pin in locking position and resilient means for connecting said lever to the engine clutch operating means.

4. In a transmission clutch mechanism for vehicle transmissions having an engine clutch and operating means therefor, in combination, an overrunning clutch mechanism including means for establishing a one-way drive through said clutch and means for establishing a two-way drive through said clutch, a shift rail for operating said two-way drive means having a lock pin receiving recess, a locking pin for engagement in said recess and abutment and cam means for axially raising said pin out of said recess by the rotation of the pin.

5. In a transmission clutch mechanism for vehicle transmission having an engine clutch and operating means therefor, in combination, an overrunning clutch including means for establishing a one-way drive through said clutch and means for establishing a two-way drive through said clutch, a shift rail for operating said two-way drive means having a lock pin receiving recess, a casing enclosing said overrunning clutch mechanism, a rotatable lock pin extending through said casing for engagement with said recess, a cam slot in said lock pin, an abutment member on said casing engaging said slot, an operating lever for oscillating said pin, a connection rod for said lever and two oppositely operating springs on said rod for operatively connecting the same with said lever.

SAMUEL O. WHITE.